United States Patent [19]

Leon

[11] Patent Number: 4,800,469
[45] Date of Patent: Jan. 24, 1989

[54] WHEEL MOUNTED SAFETY LIGHT

[76] Inventor: Thomas B. Leon, 4028 Norton Ave., Oakland, Calif. 94602

[21] Appl. No.: 124,551

[22] Filed: Nov. 23, 1987

[51] Int. Cl.⁴ .............................................. B60Q 1/26
[52] U.S. Cl. ........................................ 362/72; 362/78; 362/205; 362/200
[58] Field of Search ................... 362/72, 78, 196, 200, 362/201, 204, 203, 800, 202, 205; 340/134

[56] References Cited

U.S. PATENT DOCUMENTS

| | | | |
|---|---|---|---|
| 2,382,832 | 8/1945 | Thornton | 138/89.4 |
| 2,811,633 | 10/1957 | Bork | 240/7.55 |
| 2,852,632 | 9/1958 | Garland | 362/205 X |
| 2,852,633 | 9/1958 | Garland | 362/205 X |
| 3,789,208 | 1/1974 | Lewis | 362/78 X |
| 3,987,409 | 10/1976 | Freeman | 340/134 |
| 4,135,229 | 1/1979 | Modurkay | 362/72 |
| 4,176,390 | 11/1979 | Galbert | 362/78 X |
| 4,323,879 | 4/1982 | Kelley | 362/72 X |
| 4,383,244 | 5/1983 | Knauff | 362/78 X |
| 4,398,237 | 8/1983 | Doyel | 362/202 X |
| 4,523,259 | 6/1985 | Dorsett et al. | 362/120 |
| 4,562,516 | 12/1985 | Chastain | 362/78 |

FOREIGN PATENT DOCUMENTS

| | | | |
|---|---|---|---|
| 774386 | 5/1957 | United Kingdom | 362/72 |
| 1441201 | 6/1976 | United Kingdom | 362/72 |

Primary Examiner—Michael Koczo
Assistant Examiner—Richard R. Cole
Attorney, Agent, or Firm—Robert R. Tipton

[57] ABSTRACT

A safety warning light is adapted be mounted on the valve stem of a tire or clip to the clothing of a wearer. The apparatus includes a two-part housing and utilizes a light source, such as, a light emitting diode, powered by a battery that is connected to the light source using a switch actuated by rotating the top part of the housing with respect to the bottom part of the housing.

2 Claims, 4 Drawing Sheets

WHEEL MOUNTED SAFETY LIGHT

SUMMARY OF THE INVENTION

The device of the present invention provides a more reliable switching apparatus and a more easily seen light source in which a generally circular bottom housing having a bottom electrical conductor disposed along the inner surface thereof coaxially engages a generally circular top housing.

The top housing includes a top electrical conductor extending from proximate center thereof to proximate the outer edge thereof that can be rotated with respect to the bottom housing to connect the ends of the two conductors together in the manner of a switch.

The other end of the top conductor is connected to a light source mounted on the top housing.

The other end of the bottom conductor is connected to one side of a source of electrical energy.

The other side of the light source is connected to the other side of the source of electrical energy.

Means is provided to attaching the device to the valve stem of a tire.

Additional means is provided to attaching the device to the person's clothing.

It is, therefore, an object of the present invention to a warning safety light for mounting on a vehicle.

It is a further object of the present invention to provide a safety warning light that can be easily installed and removed from the vehicle or the person wearing the device.

It is another object of the present invention to provide a safety warning light having a wide field of view when mounted on the wheel of a vehicle or the person.

It is yet a further object of the present invention to provide a safety warning light for mounting on wheels that do not incorporate spokes.

It is still another object of the present invention to provide a wheel mounted warning light having a more reliable and durable light source.

It is a further object of the present invention to provide a safety warning light incorporating a switch that will remain in a fixed position when subjected to centrifugal, vibrational and other forces.

These and other objects of the present invention will be manifest upon study of the following description when taken together with the drawings.

DESCRIPTION OF THE PREFERRED EMBODIMENT

Figure 1:
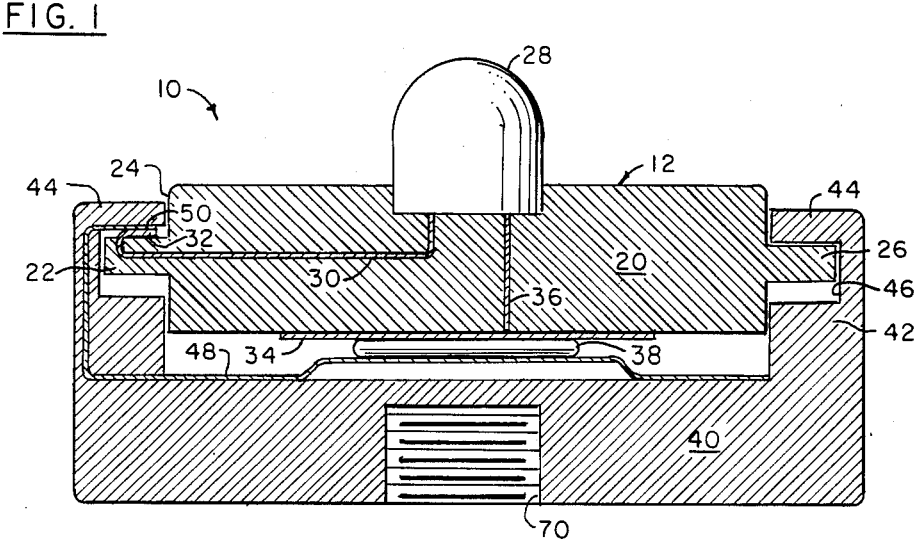
FIG. 1 is a cross-sectional, elevational view of the safety warning light device of the present invention taken at lines 1—1 of FIG. 2.

With reference to FIG. 1, there is illustrated a cross-sectional, elevational view of safety warning light 10 of the present invention comprising a generally circular top housing 12 enclosed and coaxially aligned within a generally circular bottom housing 14.

Generally circular top housing 12 comprises, basically, a base support member 20 having first tab 22 projecting radially outward from the peripheral edge 24 of top housing 12 with a second tab 26 projecting radially from the peripheral edge 24 of top housing 12 approximately 180 degrees from said first tab 22.

Top housing 12 further comprises a light emitting diode 28 located proximate the top of housing 12 and having one side electrically connected to one end of top electrical conductor 30 contained within top base support 20. The other end of top electrical conductor 30 extends to first tab 22 and is adapted to be attached to, and exposed along, the top side of tab 22 to define top electrical contact 32.

The other side of light emitting diode 28 is electrically connected to battery contact electrode 34 through conductor 36.

Contact electrode 34 is adapted to be placed in electrical contact with one side of battery 38.

Bottom housing 14 comprises, basically, a bottom base support 40 having a generally cylindrical rim 42 adapted to enclose and slide about outer peripheral edge 24 of top housing 12 in the manner of a bearing.

Cylindrical rim 42 further comprises an inwardly projecting lip 44 proximate the top of rim 42 defining a recess 46 adapted to receive and engage first and second tabs 22 and 26, respectively, of top housing 12.

A bottom electrical conductor 48 is disposed along the inner surface of bottom housing 40 having one end extending up through rim 42 to terminate along the underside of top lip 44 where it defines second electrical contact 50 adapted to make electrical contact with top electrical contact 32.

Figure 2:
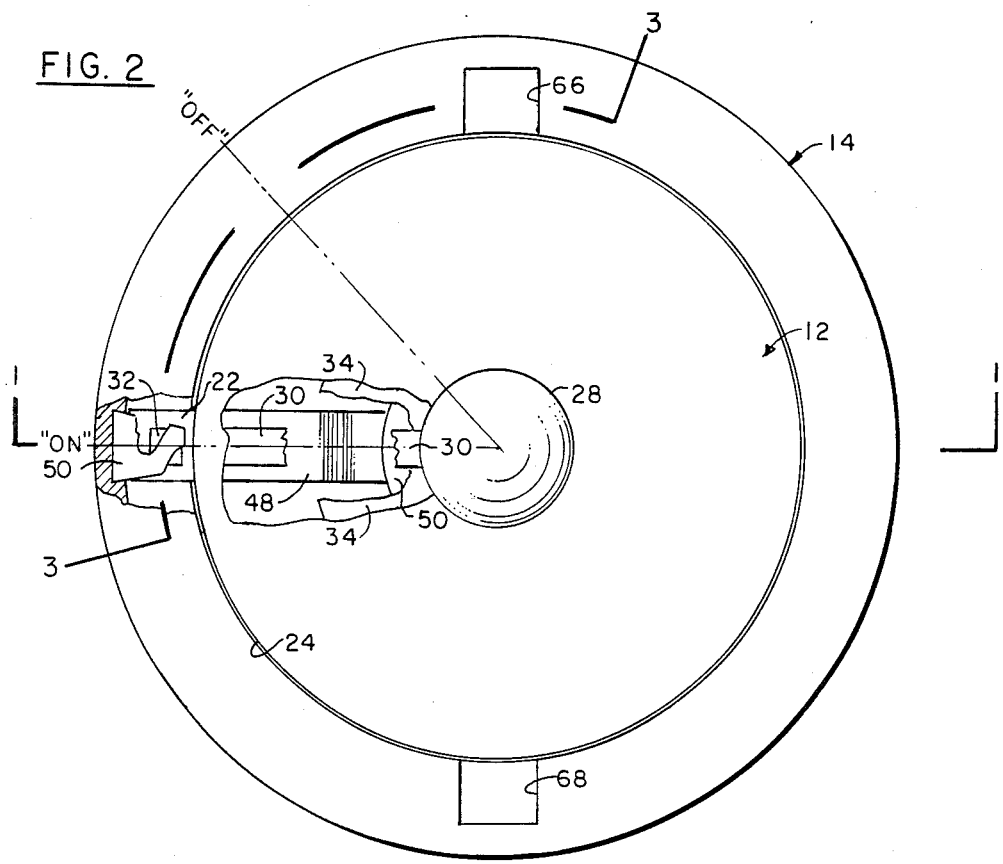
FIG. 2 is a top partially cut-away view of the safety warning light of the present invention.
Figure 3:
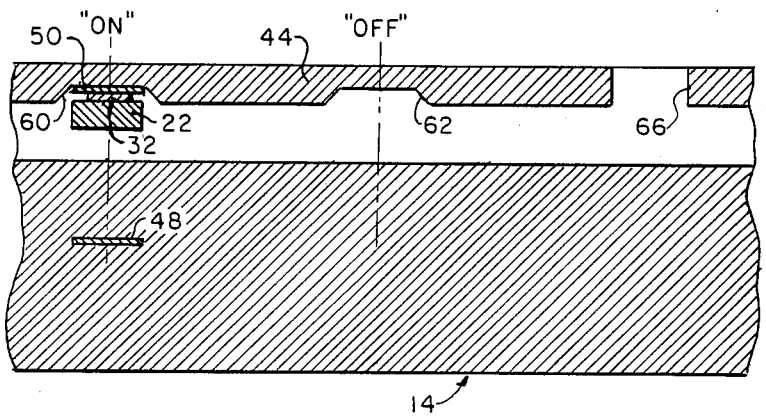
FIG. 3 is a partial sectional, elevational view of the safety warning light of FIG. 2 taken at lines 3—3.

With reference to FIG. 2 there is illustrated a top partial cut-away view of safety warning light 10 of the present invention. With reference to FIG. 3, there is illustrated a partial sectional, elevational view of safety warning light 10 of the present invention taken at lines 3—3 of FIG. 3.

Referring to FIG. 3, bottom housing 14 further comprises two pair of detents 60, 62 and along the underside of lip 44. Each pair of detents comprises two detents spaced 180 degrees apart. FIG. 3 illustrates a set of detents along one side of lip 44.

When top housing 12 is rotated to the "ON" position, detent 60 is adapted to receive the end of bottom conductor 48 defining electrical contact 50 and also receive tab 22 to make contact with electrical contact 32.

When top housing 12 is rotated to the "OFF" position, detent 62 is adapted to receive tab 22.

Referring again to FIGS. 2 and 3, a pair of oppositely disposed slots 66 and 68 are located in lip 44 which are adapted to permit top housing 12 to be removed from bottom housing 14 when top housing 12 is rotated so that tabs 22 and 26 coincide with slots 66 and 68, respectively.

Figure 4:
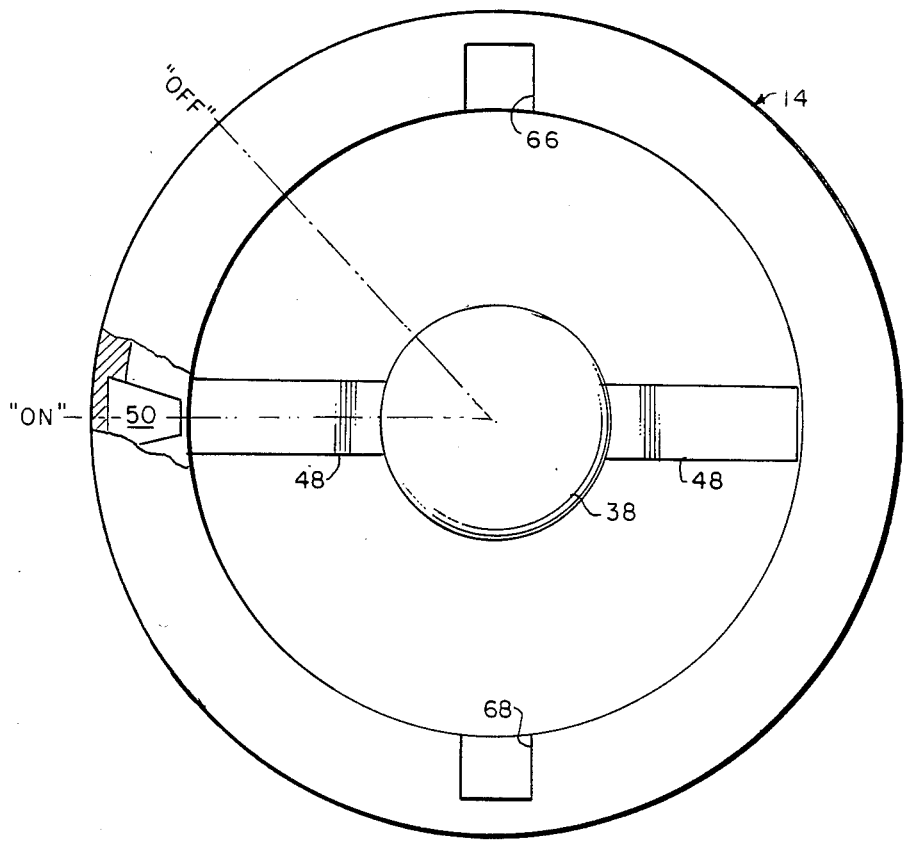
FIG. 4 is a top, partial cut-away view of the bottom housing of the safety warning light of the present invention.

With reference to FIG. 4, there is illustrated a top, partial cut-away view of bottom housing 14 with top housing 12 removed.

Bottom conductor 48 is shown disposed along the inside surface of bottom housing 14 with battery 38 resting proximate the center of bottom conductor 48 and making electrical contact therewith.

It will be noted in FIGS. 1 and 4 that the central portion of bottom conductor 48 is raised or offset from the inside surface of bottom housing 14. Bottom conductor 48 is preferably fabricated from a resilient, electrically conductive material to allow axial movement of top housing 12 when rotating top housing 12 between detents 60 and 66 and slot 66.

Figure 5:
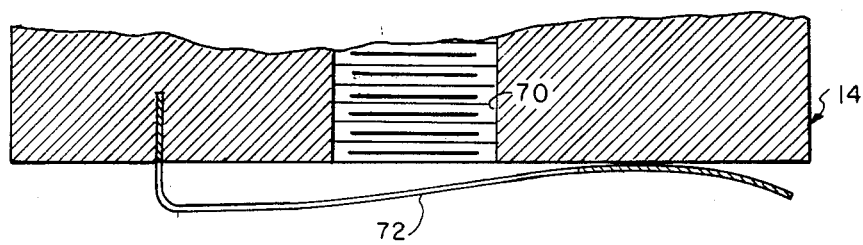
FIG. 5 is a partial cross-sectional, elevational view of the bottom housing of the present invention illustrating the clip device used for attaching the safety light of the present invention to the clothing of a person using the device.

With reference to FIG. 5, there is illustrated a partial cross-sectional, elevational view of bottom housing 14 wherein bottom housing 14 further comprises a threaded hole 70 adapted to receive the threaded valve stem of a bicycle or other vehicle tire In addition, bottom housing 14 further comprises a resilient clip 72 adapted to connect to a belt of other piece of wearing apparel.

Figure 6:
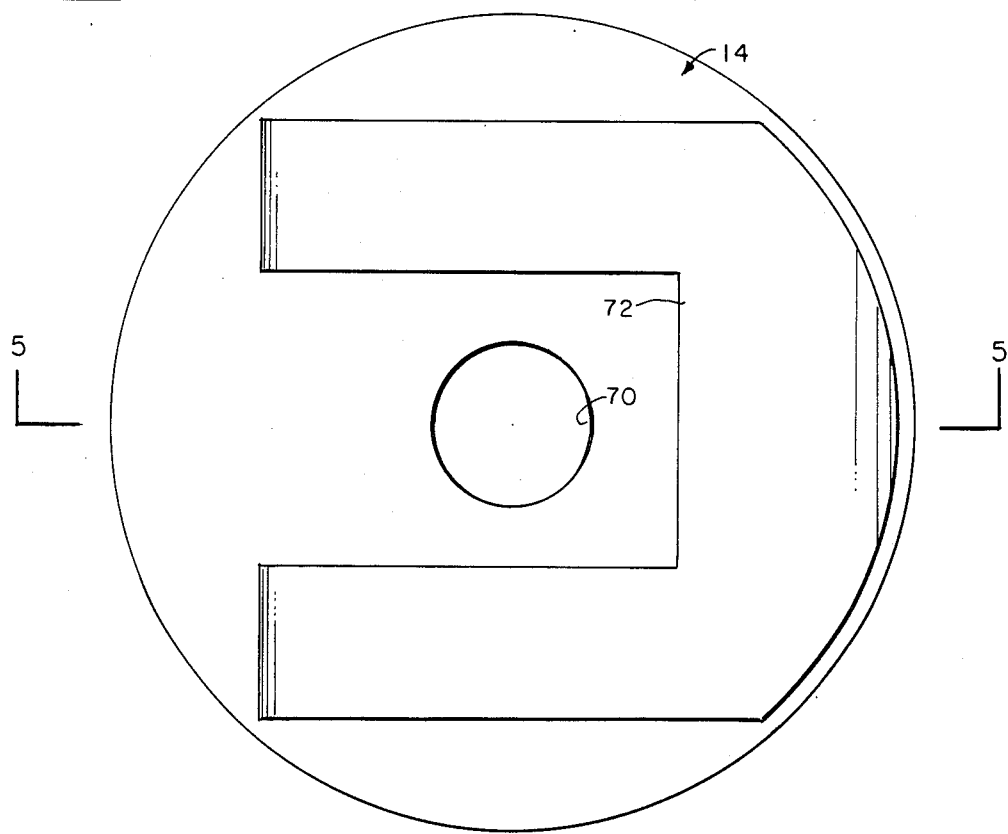
FIG. 6 is a bottom view of the bottom housing showing the clip device illustrated in FIG. 5 and the means for attaching the safety warning light to the tire valve stem.

With reference to FIG. 6, there is illustrated a bottom view of bottom housing 14 further illustrating the shape of clip 72 and its relationship to threaded hole 70.

Figure 7:
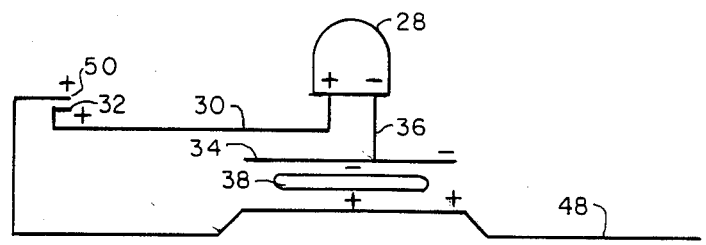
FIG. 7 is a schematic circuit diagram illustrating the manner in which the light source of the safety warning device of the present invention is energized.

With reference to FIG. 7, there is illustrated a schematic circuit diagram of the manner in which light source 28 is energized by battery 48.

In particular, one side (−) of battery 38 is connected to the appropriate side of light emitting diode 28 through battery contact plate 34 and conductor 36.

The other side (+) of battery 38 is electrical connected to bottom conductor 48 leading to bottom electrical contact 50. When top housing 12 is rotated to allow top electrical contact 32 to make contact with bottom contact 50, the electrical circuit is them completed through top conductor 30 to the other side of light emitting diode 28.

Figure 8:
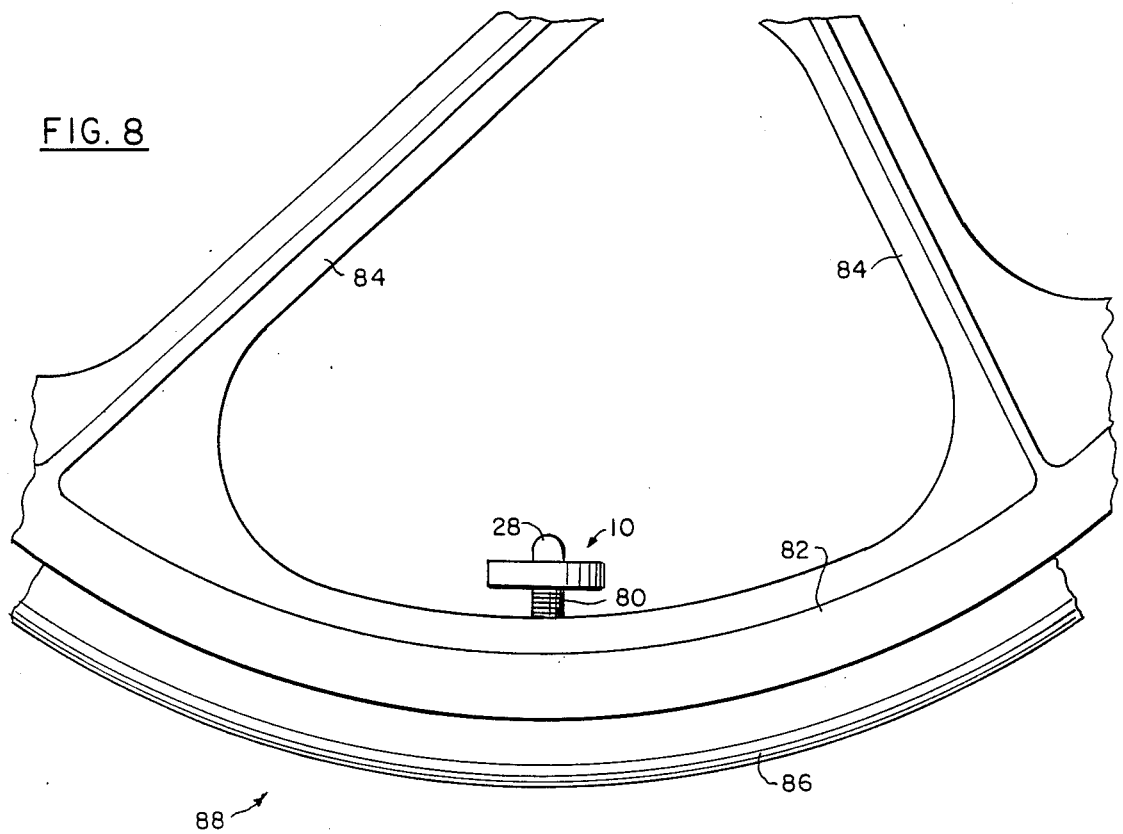
FIG. 8 is an elevational view of the safety warning light of the present invention mounted on the valve stem of a tire independent of the manner in which the rim of the wheel is connected to wheel hub.

With reference to FIG. 8, the safety warning light 10 of the present invention is connected to valve stem 80 of tire 86 which is mounted on rim 82 of wheel 88. Spokes 84 connect rim 82 to the wheel hub (not shown) common in the art.

Spokes 84 could be enlarged to define a single circular plate for connecting rim 82 to the wheel hub. The single circular plate would then have an opening for access to the tire valve on which would repose safety warning light 10.

From this position, it is apparent that light source 28 would be viewable in a 360 degree horizontal plane about the wheel as the it rotates.

To operate safety warning light 10 of the present invention, battery 38 is first placed on top of bottom electrical conductor 48 with the correct polarity in electrical contact therewith.

Top housing 12 is them place on top of bottom housing 14 with tabs 22 and 26 aligned, respectively, with slots 66 and 68 in lip 4 of bottom housing 14. Top housing 12 is them pushed axially downward, depressing raised portion of bottom conductor 48, and rotated until tab 22 is aligned with detent 62, i.e., the "OFF" position, and then released.

To turn light emitting diode on, top housing 12 is again pushed axially downward and rotated until tab 22 is aligned with detent 60, i.e., the "ON" position, and then released.

To turn light emitting diode off, the process is reversed.

Although the safety warning light 10 of the present invention has been described in detail, this specification is not intended to limit the scope of the invention except as described in the claims.

What is claimed is:

1. A safety warning light comprising
a power source,
a light source,
means for connecting said light source to said power source comprising
means defining a generally circular bottom housing having a bottom electrical conductor disposed along the inner surface thereof,
means defining a generally circular top housing having a top electrical conductor extending from proximate center thereof to proximate the outer edge thereof,
said generally circular top housing disposed generally parallel to said bottom housing and having its center coaxial with the center of said bottom housing,
means for electrically connecting one side of said light source to said top electrical conductor,
means for electrically connecting one side of said power source to said bottom electrical conductor,
means for electrically connecting the other side of said light source to the other side of said power source, said means comprising
a bottom electrical contact electrically connected to said bottom electrical conductor,
a top electrical contact electrically connected to said top electrical conductor,
said top electrical contact adapted to be electrically connected to said bottom electrical contact when said top housing is rotated to a particular position relative to said bottom housing, and
said top housing further comprises
a first tab integral with said top housing projecting radially from the peripheral edge of said top housing,
a second tab integral with said top housing projecting radially from the peripheral edge of said top housing approximately 180 degrees from said first tab,
said first tab adapted to have said top electrical contact attached thereto, and
said bottom housing further comprises
a rim integral with said bottom housing projecting upwardly about the periphery of said bottom housing nd adapted to receive said top housing,
a lip about the periphery of said bottom housing, integral with said rim, adapted to receive and engage said first and second tabs, one end of said bottom conductor being attached to the underside of said lip to define said bottom electrical contact and adapted to electrically engage said top electrical contact, and
means for biasing said top housing upwardly from said bottom housing to cause said tabs to frictionally engage the underside of said lip.

2. A safety warning light comprising
means defining a generally circular top housing having a generally flat, planar top surface, a first tab integral with said top housing projecting radially from the peripheral edge of said top housing, a second tab integral with said top housing projecting radially from the peripheral edge of said top housing approximately 180 degrees said first tab, a light source mounted on said top housing proximate the center thereof and surrounded by said generally flat planar top surface, a shallow, generally circular bottom housing comprising a generally circular bottom base support having a generally cylindrical rim projecting upwardly about the periphery thereof and adapted to receive said generally circular top housing, an inwardly projecting lip integral with said generally cylindrical rim proximate the top of said rim defining a recess adapted to receive said first and second tabs of said generally circular top housing and allow said top housing and said tabs to rotate about the axis of rotation of said generally circular top housing, means for biasing said generally circular top housing and said first and second tabs upwardly against the top inner surface of said lip, a power source disposed between said generally circular top housing and said generally circular bottom housing, means for connecting said light source to said power source comprising means for electrically connecting one side of said light source to one side of said power source, a first electrical contact attached proximate the top side of said first tab, means for electrically connecting said first contact to the other side of said light source, a second electrical contact attached to the underside of said lip, means for electrically connecting said second electrical contact to the other side of said power source, whereby, as said top housing is rotated with respect to said bottom housing, said light source is energized when said first contact engages said second contact, and means proximate the bottom of said bottom housing for connecting said housing to a bicycle tire vale stem.

* * * * *